United States Patent
Pall et al.

[19]

[11] Patent Number: 5,804,280
[45] Date of Patent: Sep. 8, 1998

[54] COMPOSITE STRUCTURE HAVING A POROUS FILTER MEDIUM AND A METHOD FOR FORMING SAME

[75] Inventors: David B. Pall, Roslyn Estates; Brian T. Muellers, Glen Cove; Peter J. Degen, Huntington; Tony Alex, Merrick; Michael Gildersleeve, Nesconset, all of N.Y.

[73] Assignee: Pall Corporation, East Hills, N.Y.

[21] Appl. No.: 649,593

[22] PCT Filed: Sep. 28, 1994

[86] PCT No.: PCT/US94/10942

§ 371 Date: Aug. 30, 1996

§ 102(e) Date: Aug. 30, 1996

[87] PCT Pub. No.: WO96/09829

PCT Pub. Date: Apr. 4, 1996

Related U.S. Application Data

[63] Continuation-in-part of Ser. No. 38,257, Mar. 24, 1993, Pat. No. 5,458,719.

[51] Int. Cl.[6] .............................. B32B 3/24; B01D 63/08; B01D 63/16
[52] U.S. Cl. .............. 428/137; 210/500.21; 210/500.38; 210/500.42; 210/500.41; 210/498; 210/499; 210/484; 210/321.84; 210/321.85; 156/155; 156/308.6; 156/305; 156/308.2
[58] Field of Search ....................... 428/137; 210/200.21, 210/500.38, 500.42, 500.41, 498, 499, 484, 321.84, 321.85; 156/155, 308.6, 305, 308.2

[56] References Cited

U.S. PATENT DOCUMENTS

| | | | |
|---|---|---|---|
| 3,494,470 | 2/1970 | Banfield | 136/148 |
| 3,544,384 | 12/1970 | Sundberg et al. | 210/321 |
| 3,578,175 | 5/1971 | Manjikian | 210/489 |
| 3,663,326 | 5/1972 | Wanesky | 156/3 |
| 3,730,353 | 5/1973 | Trasen et al. | 210/455 |
| 3,791,526 | 2/1974 | Stana et al. | 210/321 |
| 3,950,255 | 4/1976 | Ishii et al. | 210/490 |
| 3,953,566 | 4/1976 | Gore | 264/288 |
| 4,096,227 | 6/1978 | Gore | 264/127 |
| 4,181,549 | 1/1980 | McPhee | 156/146 |
| 4,187,182 | 2/1980 | Rosenberg | 210/445 |
| 4,311,661 | 1/1982 | Palmer | 264/510 |
| 4,340,479 | 7/1982 | Pall | 210/490 |
| 4,341,615 | 7/1982 | Bachot et al. | 204/296 |
| 4,347,208 | 8/1982 | Southall | 264/229 |
| 4,501,663 | 2/1985 | Merrill | 210/347 |
| 4,666,549 | 5/1987 | Boultinghouse | 156/308.6 |
| 4,774,132 | 9/1988 | Joffee et al. | 428/290 |
| 4,786,351 | 11/1988 | Elliott et al. | 156/245 |
| 4,802,982 | 2/1989 | Lien | 210/247 |

(List continued on next page.)

FOREIGN PATENT DOCUMENTS

| | | |
|---|---|---|
| 0304207 | 2/1989 | European Pat. Off. . |
| 0365112 | 4/1990 | European Pat. Off. . |
| 513796 | 11/1992 | European Pat. Off. . |
| 60-139302 | 7/1985 | Japan . |
| 267949 | 1/1996 | Taiwan . |

OTHER PUBLICATIONS

Rangarajan et al.; Desalination, "Development of Fabric Reinforced Polysulfone Membranes", Elsevier Science Publishers, No. 1, Amsterdam, NL, Nov. 1991, pp. 81–92.

M. W. Riley, "Joining and Fastening Plastics", Materials In Design Engineering, Manual No. 145, Jan. 1958, pp. 130–139.

*Plastics Engineering Handbook* (3rd Ed.), A.F. Randolph Ed. (1960), Ch. 22, pp. 479–491.

*Primary Examiner*—William P. Watkins, III
*Attorney, Agent, or Firm*—Leydig, Voit & Mayer, Ltd.

[57] ABSTRACT

A composite structure comprises a porous filter medium, a substrate provided with at least one drainage pathway, and a support and drainage medium sandwiched between the porous filter medium and the substrate. The porous filter medium, the support and drainage medium, and the substrate are bonded free of any adhesive.

53 Claims, 1 Drawing Sheet

U.S. PATENT DOCUMENTS

| | | | |
|---|---|---|---|
| 4,906,372 | 3/1990 | Hopkins | 210/321.74 |
| 4,937,024 | 6/1990 | Hickson | 264/83 |
| 4,942,013 | 7/1990 | Palmer et al. | 264/51 |
| 5,017,292 | 5/1991 | Dileo et al. | 210/645 |
| 5,108,691 | 4/1992 | Elliott | 264/554 |
| 5,110,682 | 5/1992 | Bonazza | 428/419 |
| 5,143,616 | 9/1992 | Pall et al. | 210/500.38 |
| 5,259,894 | 11/1993 | Sampson | 156/64 |
| 5,273,694 | 12/1993 | Perusich et al. | 264/41 |
| 5,275,725 | 1/1994 | Ishii et al. | 210/321.67 |
| 5,458,719 | 10/1995 | Pall et al. | 156/285 |

COMPOSITE STRUCTURE HAVING A POROUS FILTER MEDIUM AND A METHOD FOR FORMING SAME

This application is a 35 U.S.C. §371 filing of International Application PCT/US94/10942, published as WO96/09879 Apr. 4, 1996, which in turn is a continuation-in-part of U.S. Pat. application Ser. No. 08/038,257, filed Mar. 24, 1993, now U.S. Pat. No. 5,458,719, which is incorporated herein by reference.

TECHNICAL FIELD OF THE INVENTION

The present invention relates to a method of forming a composite structure. More specifically, the invention relates to a method for bonding a porous medium and a support and drainage medium to the surface of a substrate.

BACKGROUND OF THE INVENTION

Porous media are bonded to the surface of a substrate for a wide variety of purposes. For many applications, such as the formation of a resilient or acoustically absorptive surface, neither the nature of the material which accomplishes the bond nor the depth to which the bond penetrates the porous facing is critical.

For a wide range of other applications, such as the purification of pharmaceutical fluids or the removal of bacteria from foods, e.g., milk and beer, bonded assemblies which include finely porous filter media secured to a solid substrate are used. Secure bonding of the porous medium to a solid substrate is particularly necessary when the porous medium is exposed during service to very high shear forces which would disrupt an unsupported membrane.

Filtration applications also typically require that the porous medium be bonded to the substrate such that the fluid passing through the membrane is provided with passageways through which it can flow as it issues from the membrane. Typically, the passageways are grooves cut or cast into a plane surface, the grooves being configured to drain collectively into a central outlet port, which the user connects to a receiver for the filtrate.

The porous medium may be secured to the substrate by applying a layer of a viscous adhesive to the substrate and then contacting the porous medium with the adhesive layer. The use of a third component, i.e., the adhesive, which could leach into the filtrate, is very undesirable for many of the applications described above. In addition, the adhesive can often blind a substantial number of the pores and alter the permeability of the medium.

Bonded assemblies may also be produced by contemporaneously forming and integrally securing a porous medium to the surface of a substrate. This method, however, is severely limited by the requirement that the porous medium be precipitated from a liquid suspension and secured to the substrate in a single step. Some porous media, which may be employed effectively in filter applications, are not formed from liquid suspension. For example, polytetrafluoroethylene (e.g. Teflon® TFE) is typically made as a powder, which is then extruded to form a sheet, and the sheet is biaxially stretched to form a porous membrane.

A filter membrane may also be secured to a substrate by a method which involves the application of a solvent to which the filter membrane is inert, but which dissolves the substrate. The filter membrane is saturated with the solvent, and then contacted with the substrate. The contact of the saturated membrane with the substrate dissolves a portion of the substrate, which is then integrally secured to the membrane after the solvent is removed. This method has the severe fault that it may be extremely difficult to maintain a uniform distribution of solvent throughout the filter membrane at the time it is applied to the substrate. Simple dipping, or any procedure involving manipulation of the wet membrane, invariably leaves more solvent in some portions of the membrane than in others. As a result, an excessively thick bond may form in some areas of contact, while in other areas the bonding between the membrane and the substrate may be inadequate.

For many if not most applications, it is important that the membrane be positioned precisely at a specific location on the substrate. This is difficult to do, because the prewetted membrane quite generally is limp, i.e. has no rigidity, and this difficulty is compounded by the rapid evaporation of the solvent, such that a significant loss of solvent can occur in a few seconds.

Further, in the process described above, the solvent is typically allowed to evaporate during the dissolution and bonding process. The space within any grooves, which may be present in the substrate, is rapidly saturated by the vapor from a small fraction of the solvent and, thus, the bulk of the evaporation takes place at the exposed surface of the filter membrane. As solvent evaporates from the exposed surface, solvent from the remainder of the filter membrane migrates by capillarity through the membrane to the exposed surface. Accordingly, the solvent originally located in contact with the substrate, which contains dissolved substrate in solution, also evaporates from the exposed membrane surface. In the process, dissolved substrate may be deposited at the exposed surface of the filter membrane. This is highly undesirable, as the pores of the membrane may be at least partially clogged by the deposited substrate, locally altering the pore size and decreasing the permeability of the membrane.

Yet another problem exists with certain supported membranes or porous media. For example, the grooves or channels of some supported media tend to be relatively wide. In such instances, the portions of the porous medium superposed over the channels of the substrate are unsupported. While relatively thick porous media may not be significantly affected in those regions which are unsupported, when thinner media or membranes are used, large pressure differentials across the porous medium tend to flex and/or distort the medium in the regions of the channels. In those instances in which the pressure differentials across the porous medium are very high and the tensile strength of the porous membrane is low, the unsupported portions of the medium may not have sufficient pressure pulse resistance to retain its structural integrity and the porous medium may be breached. Although in some instances a thicker porous medium with a higher tensile strength may be employed, such an option may not exist for many media. Furthermore, where thicker, stronger media are available, the pressure drop across the thicker porous medium may be too high for the intended application. Another alternative is to decrease the width and increase the number of grooves in the surface of the substrate in an attempt to obtain the same volume in the grooves. However, there are physical limitations as to the number and depth of the grooves which can be used.

SUMMARY OF THE INVENTION

In one aspect of the present invention, a composite filter element structure for providing a filtrate or permeate comprises at least one porous filter medium through which filtrate or permeate passes, a substrate provided with at least one drainage pathway for passage of the filtrate or permeate, and at least one support and drainage medium sandwiched between the porous filter medium and the substrate to conduct filtrate or permeate between the porous filter medium and the substrate. The porous filter medium, the support and drainage medium, and the substrate are bonded free of any adhesive, wherein portions of the substrate are resolidified within the support and drainage medium and the porous filter medium without unduly blinding the porous filter medium.

In another aspect of the present invention, a composite filter element structure for providing a filtrate or permeate comprises at least one porous filter medium through which filtrate or permeate passes, at least one porous support medium supporting the porous filter medium and allowing filtrate or permeate to pass between the porous filter medium and the substrate, and a substrate including a drainage mechanism for passage of the filtrate or permeate. The porous filter medium and the porous support medium communicate with the drainage mechanism of the substrate. The porous filter medium and the porous support medium are bonded to the substrate free of any adhesive, wherein portions of the substrate are resolidified within the porous support medium and the porous filter medium without unduly blinding the porous filter medium.

The embodiments of the invention represent a considerable advance in the state of the art. As indicated above, conventional elements are formed by processes which either may not permit a preformed porous medium to be secured to a substrate or, in securing the porous medium to the substrate, may substantially alter the porosity or permeability of the medium.

The present invention also provides a uniformly bonded structure and a method of producing a bonded structure which includes only the filter membrane, the support and drainage medium and the substrate, thereby avoiding the use of an adhesive component which could leach into filtrate during use. Further, this invention affords a method of integrally securing a preformed porous medium, such as a polytetrafluoroethylene membrane, to a support and drainage medium and in turn to a substrate. In addition, the present invention provides a method of integrally securing a porous medium to a support and drainage medium and the latter to a substrate in a manner that does not alter the pore structure or substantially decrease the permeability of the medium. This invention also permits a filter membrane to be bonded to a support and drainage medium and a substrate with minimal obstruction of edgewise flow through those portions of the membrane immediately adjacent the bonds. Thus, bonding between adjacent layers is uniform and the porous medium is precisely located relative to the substrate. In addition, blinding or blockage of the pores of the porous medium is minimized and significantly less than conventional elements. In addition, the composite structures of the present invention demonstrate is significantly improved edgewise flow of fluids through the media and resistance to distortion or tearing when exposed to large pressure differentials in either direction across the porous medium, either in continuous or pulsed form. As a result, the composite structures of the present invention may be used in high shear applications, such as in dynamic filtration and cross-flow filtration.

Another aspect of the present invention provides a method of forming a composite filter element structure comprising positioning a porous filter medium to be in communication with a first surface of a support and drainage medium; positioning a second surface of the support and drainage medium to be in communication with a surface of a substrate having at least one fluid pathway to form a component assembly; introducing a bonding composition to the component assembly, the bonding composition at least slightly dissolving a portion of the substrate surface without significantly dissolving the porous filter medium or the support and drainage medium; contacting the support and drainage medium and the porous filter medium with the dissolved portion of the substrate; and removing the bonding composition and resolidifying a portion of the substrate within the support and drainage medium and the porous filter medium to form an adhesive-free bond between the porous filter medium, the support and drainage medium, and the substrate without unduly blinding the porous filter medium.

Another aspect of the present invention provides a method of forming the composite structure of the present invention in which a support and drainage medium is bonded to both a substrate and a porous medium on opposite surfaces of the support and drainage medium. The process includes contacting a porous medium with a first surface of a support and drainage medium and contacting the opposite surface of the support and drainage medium with a surface of a substrate, where the surface of the substrate has at least one fluid pathway. Preferably the porous medium, substrate surface, and support and drainage medium are dry when they are placed in contact. A bonding composition is then introduced to the component assembly formed from the substrate, the support and drainage medium, and the porous medium. The bonding composition at least slightly dissolves a portion of the substrate surface without dissolving the porous medium or the support and drainage medium and the dissolved portion of the substrate is contacted with the support and drainage medium and the porous medium. The bonding composition is then withdrawn, preferably, in a direction opposite to that in which it was introduced to the component assembly to form an adhesive-free bond between the porous medium, the support and drainage medium, and the substrate. A preferred embodiment includes removing the bonding composition from the component assembly preferably by means of a vacuum.

In the methods of the present invention, the bonding composition preferably includes two chemical species having controlled relative vapor pressures. The methods generally include impregnating the porous and support and drainage media with a bonding composition comprising a first chemical species, which is a solvent for the substrate, and a second chemical species which is not a solvent for the substrate (non-solvent species). Preferably neither the first chemical species nor the second chemical species is a solvent for the porous or support media. The chemical species are preferably selected such that when the bonding composition is removed by a vacuum, the first chemical species evaporates faster than the second chemical species.

These above described and other objects and advantages of the present invention will be apparent from the description of the invention which follows.

DETAILED DESCRIPTION OF THE INVENTION

Figure 1:
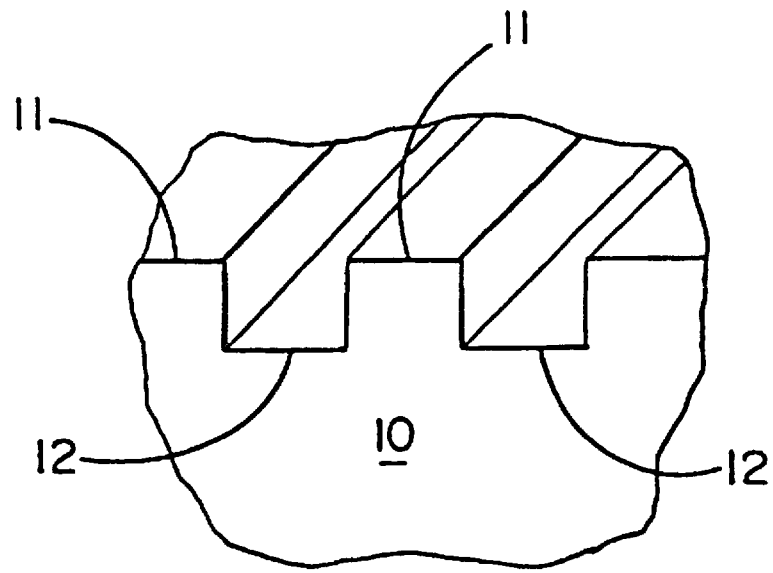
FIG. 1 is an oblique view of a section of a substrate of the present invention cut perpendicular to grooves in the substrate surface.

The present invention provides a porous, supported composite structure and a method for bonding a porous medium and a support and drainage medium to a substrate to form such a supported composite structure. Preferably, each of the porous medium and the support and drainage medium comprise only a single layer, although each medium may comprise two or more layers. More particularly, the present invention is directed to a method of integrally bonding a porous filter medium to one surface of a support and drainage medium and the opposite surface of the support and drainage medium to a surface of a substrate and to a supported composite structure produced thereby. Preferably the bond between the porous medium, the support and drainage medium, and the substrate is free of any adhesive.

The substrate may be any member having sufficient structural integrity to support the porous medium and the support and drainage medium and which can be bonded thereto by the method of the present invention. The substrate, which provides support for and defines the configuration of the support and drainage medium and the porous medium, may be flexible, semi-flexible or rigid. Further, the substrate includes a material which at least slightly dissolves in and is solvated by (i.e. absorbs and/or is softened by) the bonding composition. For example, the substrate preferably includes a polymeric material, such as a polyethersulfone, a polysulfone or a polyamide.

The substrate may be a solid structure. If the purpose of the composite structure is to act as a filter element, the substrate may include a mechanism or a pathway for draining fluid away from the substrate surface. The drainage mechanism or pathway may include one, but preferably a plurality of channels, passages, or interconnecting pores in the substrate surface. In the illustrated embodiment, the drainage mechanism includes at least one groove and preferably a plurality of grooves, which may be interconnected, in the substrate surface. Typically, when used in a filter element, the grooves are in fluid communication with a filtrate outlet port, which may be coupled to a receiver for filtrate passing through the porous medium. The filter outlet port may also be used in a preferred method of forming the composite structure to introduce bonding composition to the assembled substrate and media.

Preferably, the substrate has at least one planar surface in which the groove(s) are formed. The grooves may be spaced from the edges of the substrate, defining flats on the planar surface between the grooves and the edges. In a preferred embodiment, the substrate is formed as a sheet or plate having opposing planar surfaces. The groove(s) or recessed portion(s) may be formed in one or, preferably, both planar surfaces with each grooved surface bonded to one surface of a support and drainage medium and a porous medium bonded to the opposite surface of the support and drainage medium.

The porous medium is preferably a porous structure that may be employed as a filter medium and is preferably formed from a polymeric resin but may include any material capable of forming a porous structure. The substance(s) from which the porous medium, as well as the support and drainage medium are formed are sufficiently chemically dissimilar to the substrate material in a particular composite structure so as to have no significant solubility in the bonding composition employed in the present invention. Thus, the same substance is most preferably not used to form a substrate and a support and drainage medium and/or a porous medium in the same composite supported structure.

The porous medium may comprise any one of a number of materials, including fibrous media made by a variety of means including melt blowing, Fourdrinier deposition, or air laying. The porous medium may also comprise porous membrane media made by a variety of means including (i) introducing a solution of a resin in a relatively good solvent into a solution which is a relatively poor solvent for the resin, e.g., as described in U.S. Pat. No. 4,340,479, (ii) by preparing a solution of a resin in a mixture of two solvents, one of which is a better solvent with a relatively higher vapor pressure compared with the second solvent, and allowing the solvents to evaporate, thereby forming a porous film, or (iii) as in the case of Teflon membranes, by precipitating a suspension of finely particulate PTFE, which is then hot compressed to form a sheet in which the particles are bonded to each other, followed by stretching the sheet to form the membrane.

In a preferred embodiment, the porous medium may comprise a microporous filter medium, such as a microporous fibrous matrix or a microporous membrane. The method of this invention is particularly useful for securing a microporous filter medium to a substrate.

Exemplary porous media may include fluoropolymers, polyamides, polyethersulfones, acrylic polymers, polyesters, or cellulose ester. Preferably, the porous medium includes poly(vinylidene difluoride), polytetrafluoroethylene or a nylon, such as nylon-46, nylon-6, nylon-66 or nylon-610. For example, microporous filter media may be prepared using polyamides following the procedure of U.S. Pat. No. 4,340,479, using poly(vinylidene difluoride) following the procedure of U.S. Pat. Nos. 4,341,615 and 4,774,132, using polytetrafluoroethylene following the procedure of U.S. Pat. No. 3,953,566 and 4,096,227, or using a polyethersulfone following the procedure of copending U.S. application Ser. No. 07/882,473.

When used as filter media, the porous media of the present invention are not restricted to any particular pore sizes but will depend on the particular materials being filtered. However, the porous media preferably have pore ratings ranging from about 10 nanometers to about 10 $\mu$m or more, preferably from about 0.04 $\mu$m to about 5 $\mu$m.

The support and drainage medium or layer is preferably formed from a very open material, allowing fluid to flow laterally and to uniformly distribute the fluid across the downstream surface of the porous medium. Thus, the support and drainage layer preferably has a very low edgewise flow resistance. The support and drainage medium to some extent supplements and provides similar functions to some of those provided by the substrate. Thus, the support and drainage layer provides the ability to conduct liquid away from the downstream surface of the porous medium toward the drainage pathways of the substrate. In addition, the support and drainage layer provides additional structural integrity or strength to the porous medium. Thus, while the substrate provides most of the support to the porous medium, in those locations where the porous medium would not be supported by the substrate, e.g., because of recesses in the substrate underlying the porous medium, the support and drainage medium provides support which increases the resistance to deformation of the porous medium into the recessed portions of the substrate. Such support by the support and drainage medium is effective in preventing undue distortion and/or breaches of the porous medium under sustained high pressure conditions or short term pressure pulses in which the pressure drop across the medium involves a significant force on the media. The support and drainage medium preferably provides support and resists undue distortion and/or breaching of the porous medium at pressure drops in the forward filtration flow direction across the membrane of at least about 25 psid, more preferably of at least about 75 psid, and most preferably of more than about 100 psid.

The support and drainage medium should, like the porous medium, be substantially insoluble in the solvent system used as the bonding composition to bond the substrate to the support and drainage medium as well as to the porous medium. The support and drainage medium should also not be unsuitably affected in any manner by contact with the bonding composition or any liquid medium which it may contact in use.

Any suitable woven or nonwoven material having a relatively coarse porosity and a relatively low edgewise flow resistance compared to the porous medium can be used for the support and drainage medium, with nonwoven materials being generally preferred. Typically, such support and drainage media have air permeabilities from about 70 scfm to about 1500 scfm at ½ inch water. Preferably, the support and drainage medium used in the present invention should have a tensile strength of at least about 75 lbs/in$^2$ (5.2 kgs/cm$^2$) and a thickness of about 1 to about 20 mils (about 25 microns to about 0.51 mm), more preferably from about 3 to about 10 mils. The air permeability of the support and drainage medium is preferably at least about 70 scfm/ft$^2$ of airflow at one-half inch of water, most preferably about 100 to 300 scfm/ft$^2$. Natural fibers or polymeric materials may be employed to form the support and drainage medium, with certain polymeric materials being preferred. Preferably the support and drainage medium is formed from a polyolefin, such as polypropylene, or a polyester, such as polyethylene terephthalate. However, polyamides, aramids and glass fibers may also be used.

Preferred nonwoven support and drainage media include a polyethylene terephthalate polyester web available from Hirose® as 05TH15, a polypropylene web available from Hirose® as HOP30H, and spunbonded polypropylene media available from Midwest Filtration Company as Unipro.

Woven support and drainage media are less preferred than nonwoven media because they typically are thicker and have a less uniform surface and high edgewise flow resistance. However, woven support and drainage media typically have greater strength than nonwoven media so they may be preferable for substrates with wide grooves or in high pressure environments. A preferred woven material is a polyester mesh available from Tetko® as mesh no. 7-105/52.

As shown in FIG. 1, the portion of the substrate 10 between adjacent grooves 12 is referred to hereinafter as the crest 11. The grooves 12 may have any suitable configuration, such as a semicircular configuration, a V-shaped configuration or the generally U-shaped configuration shown in FIG. 1. Similarly, the crests 11 may have a variety of configurations, such as the apex of the angle between closely-spaced V-shaped grooves or, more preferably, a flat planar surface between more widely spaced grooves. The crests 11 constitute much of the substrate surface to which the support and drainage medium 13 and the porous medium 5 are secured.

Figure 2:
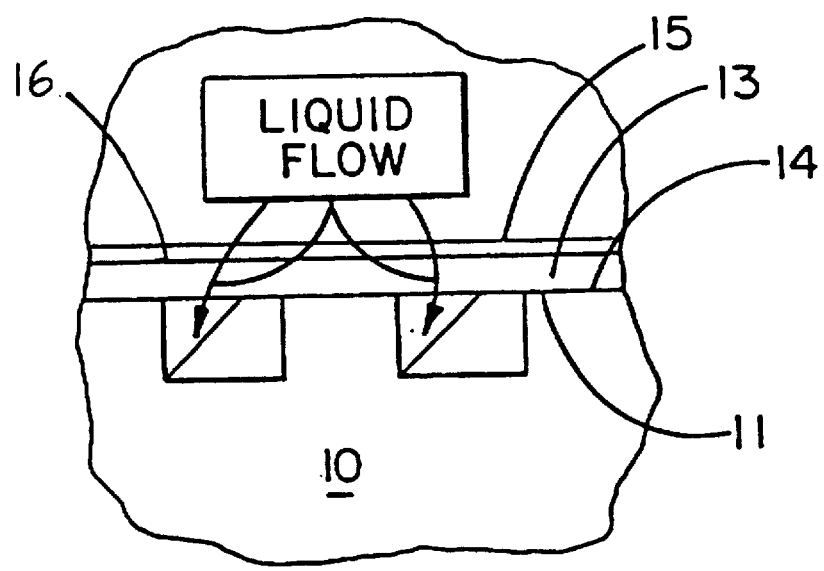
FIG. 2 is an oblique view of a section of a composite structure of the present invention including the section of the substrate of FIG. 1.

As shown in FIG. 2, the porous medium 15, the support and drainage medium 13, and the substrate are bonded together, preferably by dissolved substrate free of any adhesive. The support and drainage medium 13 is integrally secured to the substrate surface 14 by forming a bond between the crests 11 and the support and drainage medium 13. In the composite structure of the present invention, the porous medium 15 is also integrally bonded to the support and drainage medium 13 by a bond formed between the surface portions 16 of the two media. Typically, the dissolved substrate material which bonds the substrate 10 to the support and drainage medium 13 and the support and drainage medium 13 to the porous medium 15 extends across the thickness of the support and drainage medium 13 from one bonded surface to the other bonded surface. Thus, to provide an effective bond, the thickness of the support and drainage medium 13 is preferably less than about 20 mils (0.51 mm). The depth of penetration of the bond 16 into the porous medium 15 may preferably be a very small fraction of the thickness of the porous medium 15, as this permits the portion of the porous medium 15 above the crests 11 to function effectively without blinding by allowing edgewise flow. This is however, much less of a problem with the composite structure of the present invention as compared with conventional elements which lack the support and drainage medium of this invention.

An embodiment of the present invention also comprises a method for bonding a porous medium and a support and drainage medium to a substrate which includes, for example, contacting a porous medium with one surface of a support and drainage medium and the opposite surface of the support and drainage medium with a surface of a substrate so that the support and drainage medium is sandwiched between the porous medium and the substrate. Preferably this is done when both media and the substrate surface are dry. The support and drainage medium and at least a portion of the porous medium are then impregnated with a bonding composition which at least slightly dissolves the substrate surface without dissolving the porous medium or the support and drainage medium.

Initially, the components of the composite structure (e.g., the substrate, the support and drainage medium, and the porous medium) are located with the support and drainage medium sandwiched between the porous medium and the substrate. In composite structures in which the substrate includes fluid pathways or grooves on opposing surfaces, the substrate is sandwiched between two support and drainage media, and the first support and drainage medium, the substrate, and the second support and drainage medium are, in turn, sandwiched between two porous media. Each surface of the substrate then contacts one surface of a support and drainage medium while the opposite surface of the support and drainage medium contacts one surface of a porous medium.

The components of the composite structure are placed between clamping plates of a rigid, liquid impervious material, such as aluminum. In many instances, it is desirable to place a porous pad between the clamping plate and the porous medium in contact with the outer surface of the porous medium. The material from which the porous pad is formed has properties, including the non-solubility in bonding composition, similar to those of the support and drainage medium used in the present invention. The thickness of the pad, however, is preferably much greater than that of the support and drainage medium used in a particular application so the porous pad may contain a greater volume of the bonding composition. For example, the porous pad may contain from 1 to 30 times the volume of the bonding composition compared to the porous medium and the support and drainage medium. Materials suitable for use as a porous pad include the same materials used for support and drainage media. In addition, a coarse mesh may be positioned between the clamping plate and the porous pad. The apparatus, as well as many of the techniques, used to form the composite structure of the present invention are analogous to those described in commonly owned, co-pending International Application No. PCT/US94/03104 filed 23 Mar. 1994.

Once the coarse mesh, porous pad(s) and the components of the composite structure are placed between the clamping plates, the clamping plates are activated to compress the entire assembly. In a preferred embodiment, pressure is applied to force the coarse mesh, the porous pad, the porous medium, the support and drainage medium, and the substrate together, compressing the assembly and ensuring that the porous medium, the support and drainage medium, and the substrate are in firm contact. The pressure applied by the clamping plates varies with the nature of the substrate and the media used. The pressure suitably ranges from bare contact to about 100 psi. Preferably the pressure is about 2 to about 25 psi and most preferably is about 5 to about 7 psi.

Once the assembly is clamped together, a bonding composition is introduced to the clamped assembly to bond the porous medium, the support and drainage medium, and the substrate. The bonding composition preferably is free of any adhesive and comprises a mixture of at least two chemical species, the first chemical species being a good solvent for a substrate and the second chemical species being a non-solvent for the substrate. Preferably, neither the solvent species nor the non-solvent species is a solvent for the support and drainage medium or the porous medium. The starting constitution of the bonding composition may vary from 100% solvent species and 0% non-solvent species to about 10% solvent species and 90% non-solvent species by weight. More preferably, the starting composition is in the range from about 70% solvent species and 30% non-solvent species to about 30% solvent species and 70% non-solvent species.

Exemplary chemical species which may be used as a solvent species include but are not limited to halogenated hydrocarbons, such as methylene chloride or chloroform. Preferably, the solvent species includes methylene chloride. Exemplary chemical species which may be used as the non-solvent species include but are not limited to alcohols and hydrocarbons. Preferably, the non-solvent species is methanol, cyclopentane, polymethyl pentane. Exemplary bonding compositions for bonding a polyamide, a poly (vinylidene fluoride) or a polytetrafluoroethylene porous medium and a polyester or polyethylene support and drainage medium to a polyethersulfone or polysulfone substrate include mixtures of methylene chloride as the solvent species and methyl alcohol, polymethyl pentane, or cyclopentane as the non-solvent species.

The bonding composition may be introduced to the clamped assembly in any suitable manner. In a preferred method, the bonding composition may be introduced first to the substrate whence it flows to and contacts the support and drainage medium, ultimately impregnating and saturating the support and drainage medium. The bonding composition then contacts at least the surface of the porous medium contacting the support and drainage medium. Preferably the bonding composition also saturates the porous medium, the porous pad, and the coarse mesh.

As indicated above, the substrate is provided with a mechanism or a pathway for draining filtrate away from the substrate surface, such as channels or grooves. These channels or grooves may also serve as the path of the bonding composition along the substrate to the support and drainage medium and the porous medium and hence to the porous pad and the coarse mesh. Frequently, particularly when the substrate is a rigid solid material of significant thickness, the substrate is also provided with a filtrate outlet port or permeate port which is in fluid communication with the grooves in the substrate surface. When such a port is provided in the substrate, the bonding composition may be introduced to the substrate, for example, using a syringe or a syringe pump and/or an appropriate fitting in the port. While the orientation of the clamped assembly does not appear to be critical, during the introduction of the bonding composition when the bonding composition is introduced from the direction of the substrate and flows to the porous medium, it is generally preferred to orient the clamped assembly in a vertical position with the permeate port at the top.

The impregnated porous medium, the impregnated support and drainage medium, and the substrate surface are maintained in contact until the substrate surface is at least slightly solvated by or slightly dissolved in the bonding composition and the dissolved substrate contacts the support and drainage medium and the porous medium. The bonding composition and the dissolved substrate wicks along the support and drainage medium between the porous medium and the crests and flats of the substrate and into the porous medium. Preferably, the characteristics of the bonding composition are selected or adjusted to obtain a satisfactory degree of bonding during a hold period of at least about 15 to 25 seconds. ("Hold period" refers to the time during which the porous medium, the impregnated support and drainage medium, and the substrate are maintained in contact from the introduction to the removal of the bonding composition.) Still longer hold periods, such as from about 100 to about 150 seconds or more, are more preferred.

The optimum duration of the hold period is preferably determined empirically for a specific bonding composition. Generally, the bond strength increases but the permeability of the porous medium decreases with increasing hold time. For example, the final composite structure may be tested by passing water therethrough in the normal filtration flow direction (i.e., from the porous medium through the support and drainage medium to the substrate) in order to determine what percentage of the permeability of the porous medium has been lost. This percentage becomes higher as the hold period is increased and more of the dissolved substrate wicks into the porous medium. The composite structure may also be tested by flowing water in the reverse filtration flow direction, in order to determine the pressure at which the porous medium is duely distorted or separates from the support and drainage medium and/or the latter from the substrate. Several specimens can be made using a given bonding composition and various hold periods. The test data derived from these specimens may then be used to select an optimum hold period.

The optimum hold period varies greatly depending on the particular chemical species used to prepare the bonding composition. Because the bonding composition may be compounded using a combination of an aggressive solvent species with a non-solvent species, the degree of solvency of the substrate in the bonding composition, and hence the hold period required, may be adjusted by varying the proportions of the two species.

When the bonding composition is introduced to the clamped assembly, some parts of the porous medium, the support and drainage medium and the substrate are unavoidably wetted by the bonding composition before other parts. For example, if the substrate, support and drainage medium, and porous medium being bonded are quite large, some parts may be exposed for as much as 15 seconds or more longer than other parts. If the bonding composition is selected or compounded such that the hold period is about 15 seconds, then some parts of the porous medium in contact with the support and drainage medium may have been exposed for twice as long as others. This may lead to overbonding of one section of the resulting composite structure with the flow of filtrate through the composite structure inhibited locally, while another section may fail in the reverse filtration flow mode.

A bonding composition comprising a mixture of chemical species makes possible relatively longer hold periods. As noted above, the advantage of longer hold periods is that the effect of the differential wetting which can occur during the filling operation is minimized. When compared, for example, with the same 15 second wetting differential of the preceding paragraph, the use of a mixture of chemical species composition for which bonding is optimized by a 150 second hold period reduces the difference between the longest and shortest total time during which any part of the substrate is in contact with the impregnated porous medium prior to flushing to about 10% of the hold period.

After the hold period, the bonding composition is then withdrawn or removed from the clamped assembly. For example, the bonding composition may be withdrawn in a direction opposite to that in which it was introduced, i.e., from the porous medium through the support and drainage medium and then through the substrate, e.g. along the filtrate pathway and out the filtrate port. As soon as the desired hold period between the porous medium, the support and drainage medium and the substrate has been reached, the bonding composition contained in the coarse mesh and in the porous pad may be rapidly flushed through the porous medium and the support and drainage medium, preferably in the direction of the substrate and out of the clamped apparatus via the grooves and the filtrate port of the substrate. For example, the bonding solution may be removed by applying air or other gas pressure at the coarse mesh or the porous pad or by applying a vacuum to the side of the porous medium closest to the substrate, e.g., by applying a vacuum to the substrate outlet port. The application of pressure or vacuum may then be continued until the now bonded structure is dry (i.e., the residual bonding composition has been evaporated), in the one case by evaporation into the introduced gas and in the other by evaporation of the solvent into the vacuum. As the solvent species is evaporated from the bonding composition, the dissolved substrate precipitates and solidifies within the support and drainage medium and the porous medium and on the surface of the substrate, mechanically entangling and generating a strong, secure bond between the substrate, the support and drainage medium, and the porous medium.

The rapid flushing of bonding composition from the coarse mesh and the porous pad through the porous medium towards the substrate is beneficial, as it removes some of the dissolved substrate from the porous medium. Allowing all of the dissolved substrate to remain in place could unduely blind the porous medium and partially obstruct filtrate flow in the porous medium.

It is desirable to reduce as much as possible differences in exposure time in this stage between one part of the bonded surface and another. This may be accomplished in part by applying a high degree of vacuum at the conclusion of the hold period, thereby rapidly removing the bonding composition by evaporation as the bonding composition is being flushed through the porous medium. The effectiveness of this procedure is, however, hampered by the absorption of heat during vaporization which cools the chemical species contained in the bonding composition, reducing their vapor pressure and the effective pumping rate. However, the non-solvent species may be selected to have a lower vapor pressure than the solvent species of the bonding composition, preferably by about 10% or more at ambient temperature. When the vacuum is applied, the solvent species is removed faster than the non-solvent species, thereby decreasing the concentration of the solvent species in the residual bonding composition. Preferably, the starting constitution of the bonding composition is chosen such that the residual bonding composition becomes a non-solvent for the substrate after a very short period of evaporation, thereby preventing any further dissolution of the substrate and limiting the time during which dissolution of the substrate occurs to a very short period after exposure to the vacuum, which may be as short as about 5 seconds or less.

Various alternative methods also embody the present invention. As one alternative method, bonding composition may be introduced from the direction of the coarse mesh through the porous pad to the porous medium and then through the support and drainage medium to the surface of the substrate. As with the method described immediately above, the bonding composition is allowed to remain in the porous and the support and drainage media, both of which are impregnated, and in contact with the surface of the substrate for a suitable hold period. As another embodiment, the bonding composition may be removed from the compressed assembly in the direction of the coarse mesh or porous pad using a pressure differential, for example, by applying a vacuum at the coarse mesh or the porous pad.

Test Methods

The following non destructive test methods are conducted on composite structures comprising microporous membrane filter elements made by methods of this invention. The filter elements are generally tested in a leak-tight assembly having seals which separate the upstream side from the downstream side of the filter element.

Bond Strength (Reverse pressure): The bond strength between individual components and the adjacent component to which they are bonded in the composite structure, i.e., the porous medium, the support and drainage medium, and the substrate, can be determined by applying pressure in the reverse filtrate flow direction. Pressure is increased incrementally until the bond between the porous medium, the support and drainage medium, and the substrate fails. If no evidence of bond failure is observed at 5 psi for a 60 second dwell time, the relative bond strength is deemed acceptable.

Permeability (Flow $\Delta P$): The effective permeability of a porous medium can be determined by measuring the flow of water as a function of applied pressure. Using water at ambient temperature, which has been previously passed through a 0.04 $\mu$m filter, the filtrate flow and permeability is measured in the forward filtrate flow direction at 2.5, 5.0, and 10.0 psi. The data is reported as an average flow rate in units of mil/min/psi.

Porosity Bubble Point Test: Each membrane filter element is tested for porosity by using a bubble point test as described in ASTM F316-86.

Forward Pressure/Temperature Rating: The relative forward pressure/temperature rating of a porous medium bonded to a substrate can be obtained by applying pressure in the filtrate forward flow direction, at a given temperature, until the porous medium begins to yield or gross failure is observed. Hot water filtered through a 0.1 $\mu$m filter is pumped through the composite structure at 60 psi pressure and 90° C. for 30 minutes.

EXAMPLES

Example 1

A ¼-inch thick, 16 inch diameter semicircular injection molded polysulfone disk served as the substrate. The semicircular disk was provided with a series of concentric grooves on both sides that drain to a single central channel and permeate port. A wet laid polyester nonwoven fibrous web available under the trade designation HIROSE 05TH15 was used as the support and drainage medium. An ULTIPOR® $N_{66}$ polyamide 0.45 µm rated microporous membrane available from Pall Corporation, East Hills, N.Y. served as the porous medium. The support and drainage medium and porous medium were cut to dimensions such that once the support and drainage medium and the porous medium were each positioned on and adjacent the substrate, respectively, the entire grooved area of the substrate was covered, extending past the peripheral grooves onto the flats by 0.300 inch (7.6 mm). The substrate was sandwiched between a layer of support and drainage medium and a layer porous medium on both sides, with the support and drainage medium layers positioned closest to the substrate. This layered assembly was then placed between a pair of porous pads consisting of 10 layers of spunbond polypropylene nonwoven available under the trade designation LUTRASIL LSVP 688 and a pair of ¾" aluminum plates and clamped at 7 psi clamping pressure. The permeate port, which extended out from the clamping plates, was equipped with an O-ring sealed stainless steel fixture to permit the bonding composition to be injected and evacuated from the permeate port. The bonding composition consisted of a solvent/non-solvent mixture of 54% methylene chloride and 46% cyclopentane, by weight. With the clamped assembly in the vertical position, 150 ml of bonding composition was injected quickly through the permeate port with a glass syringe, filling the grooves of the substrate, the support and drainage media, the porous media and the porous pads with bonding composition and expelling the air. Once the bonding composition was injected, a hold time of 120 seconds was initiated. After 120 seconds elapsed, the excess bonding composition was evacuated by applying vacuum for 15 minutes at the permeate port. After 15 minutes, evacuation was discontinued and the composite structure comprising a filter element was removed from the clamped plates. The bond strength was tested by applying a reverse pressure of 5 psi for 60 seconds at the permeate port with no evidence of membrane failure, indicating that the porous medium was integrally bonded to the substrate. The flow ΔP and bubble point were determined to be 1215 ml/min/psi and 31.5 psi, respectively. The flow ΔP and the bubble point of the porous medium prior to bonding were determined to be 1550 ml/min/psi and 31.0 psi, respectively. Thus, the composite structure retained 78% of the porous medium effective permeability with no substantial alteration in pore size as a result of the bonding method described.

Example 2

A ¼-inch thick, 6" diameter, circular injection molded polysulfone disk of the type used in Example 1 but having a series of concentric grooves on only one side and draining to a single central channel and permeate port served as the substrate. As in Example 1, a wet laid polyester nonwoven fibrous web available under the trade designation HIROSE 05TH15 served as the support and drainage medium, and an ULTIPOR $N_{66}$® polyamide 0.45µ rated microporous membrane available from Pall Corporation served as the porous medium. The support and drainage medium and porous medium were cut to dimensions such that once the support and drainage medium and porous medium were positioned on the substrate, the entire grooved area of the substrate was covered, extending past the peripheral grooves onto the flats by 0.300 inch. The support and drainage medium was sandwiched between the substrate and the porous medium on the grooved side, with the support and drainage medium positioned closest to the substrate. This layered assembly was then positioned between a pair of ⅛" aluminum plates, a porous pad consisting of 10 layers of a spunbond polypropylene nonwoven available under the trade designation LUTRASIL LSVP 688 was placed between the porous medium and one of the clamping plates and the assembly was clamped together at 8 psi clamping pressure. The permeate port, located on the ungrooved side of the substrate, was equipped with an interference fit polypropylene luer fitting to permit the bonding composition to be injected and evacuated from the permeate port. The bonding composition consisted of a solvent/non-solvent mixture of 54% methylene chloride and 46% cyclopentane, by weight. With the clamped assembly in the horizontal position and the grooves in the upper surface of the substrate, 45 ml of bonding composition were injected quickly through the permeate port with a glass syringe, filling the grooves of the substrate, the support and drainage medium, the porous medium, and the pad with bonding composition and expelling the air. Once the bonding composition was injected, a hold time of 150 seconds was initiated. After 150 seconds elapsed, the excess bonding was evacuated by applying a vacuum for 2 minutes at the permeate port. After 2 minutes, evacuation was discontinued and the composite structure comprising a filter element was removed from between the clamped plates. Flow ΔP and bubble point of the composite structure were measured at 260 ml/min/psi and 31 psi, respectively. Flow ΔP and bubble point of the unbonded porous medium were measured at 313 ml/min/psi and 31 psi, respectively. Thus, the composite structure retained 83% of the porous medium effective permeability with no alteration in pore size. The bond strength was tested by applying a reverse pressure of 5 psi for 60 seconds at the permeate port with no evidence of membrane failure, indicating that the porous medium was integrally bonded to the substrate.

Example 3

A polytetrafluoroethylene 0.2µ rated microporous membrane, serving as the porous medium, was bonded with a polyester nonwoven support and drainage medium and a polysulfone disk of the type and by the general method described in Example 2. The bond strength was tested by applying a reverse pressure of 5 psi for 60 at the permeate port with no evidence of membrane failure, indicating that the porous medium was integrally bonded to the substrate. The bubble point pressure of the porous medium measured in alcohol before and after bonding was 15.6 and 15.5 psi, respectively, indicating no alteration in pore size. The flow ΔP of the composite structure was measured at 194 ml/min/psi.

Example 4

An ULTIPOR® $N_{66}$ polyamide 0.45 µm rated microporous membrane available from Pall Corporation served as the porous medium, and a woven polyester mesh available under the trade designation TETKO PeCap 7-105/52 served as the support and drainage medium. The porous medium and the support and drainage medium were bonded to a polysulfone disk of the type and generally by the method described in Example 2. A volume of 32 ml of bonding composition was injected into the permeate port and a hold time of 200 seconds was used. After 200 seconds elapsed, the excess bonding composition was evacuated by applying a vacuum for 3 minutes at the permeate port. After 3 minutes, evacuation was discontinued and the composite structure was removed from between the clamped plates. The bond strength was tested at a reverse pressure of 5 psi for 60 seconds at the permeate port with no evidence of membrane failure, indicating that the porous medium was integrally bonded to the substrate. Flow ΔP and bubble point of the composite structure element were measured at 246 ml/min/psi and 31 psi respectively. Flow ΔP and bubble point of the unbonded porous medium were measured at 314 ml/min/psi and 31 psi, respectively. Thus, the composite structure retained 79% of the porous medium effective permeability with no alteration in pore size.

Example 5

A composite structure was prepared as described in Example 2 and tested to establish a forward pressure/temperature rating. The composite structure was exposed to 90° C. filtered deionized water at 60 psi forward pressure for 30 minutes. The bond strength was also tested at a reverse pressure of psi for 60 seconds applied at the permeate port with no evidence of membrane failure, indicating that the porous medium remained integrally bonded to the substrate. The flow ΔP and bubble point of the composite structure before the exposure were measured at 250 ml/min/psi and 30.0 psi, respectively. After the exposure, the flow ΔP and bubble point were measured at 270 ml/min/psi and 30.5 psi respectively, indicating no significant alteration in permeability or pore size. No evidence of membrane yield was observed.

As shown in the previous disclosure and examples, a composite structure embodying the present invention has many advantages, in particular, the composite structure may comprise a highly superior filter element. For example, filter element is capable of withstanding reverse pressures of 5 psi and forward pressure drops across the porous mediium of at least about 25 psid. Further, the bond between the porous medium, the support and drainage medium, and the substrate is exceedingly strong, enabling the porous medium to withstand sheer rates of about 5000 per second. Not only is the bond exceedingly strong bu the permeability of the bonded porous media remains exceedingly high. For example, permeability of the bonded porous medium is at least about 50% of the permeability of the unbonded porous medium. In addition, the porosity of the bonded porous medium is substantially unchanged from the porosity of the onbonded porous medium.

Another advantage of filter elements embodying the present invention is that the bond between the porous medium, the support and drainage medium, and the substrate is formed without any adhesive by the solidification of the dissolved substrate. Consequently, there is no adhesive to leech into the filtrate and the bond is not effected by aggressive chemicals unless the chemicals are capable of attacking the substrate. Further, where the substrate is formed from a high temperature polymeric material, the bond remains intact at elevated temperatures until the softening point of the substrate is reached. For a high temperature polymer such as polysulfone, operating and sterilization temperatures may be as great as 250 degrees celcius.

Although the present invention has been described in terms of exemplary embodiments, it is not limited to these embodiments. Alternative embodiments, examples, and modifications which would still be encompassed by the invention may be made by those skilled in the art, particularly in light of the foregoing teachings. Therefore, the following claims are intended to cover any alternative embodiments, examples, modifications, or equivalents which may be included within the spirit and scope of the invention as defined by the claims.

We claim:

1. A composite filter element structure for providing a filtrate or permeate, the composite filter element structure comprising:

a porous filter medium through which filtrate/permeate passes;

a substrate provided with at least one drainage pathway for passage of the filtrate/permeate; and a support and drainage medium sandwiched between the porous filter medium and the substrate to conduct filtrate/permeate between the porous filter medium and the substrate; the porous filter medium, the support and drainage medium, and the substrate being bonded free of any adhesive, wherein portions of the substrate are resolidified within the support and drainage medium and the porous filter medium without unduly blinding the porous filter medium.

2. The composite filter element structure according to claim 1 wherein the porous filter medium includes a polyamide, fluoropolymer, polyethersulfone, acrylic polymer, polyester or cellulose ester.

3. The composite filter element structure according to claim 1 wherein the substrate comprises polysulfone, polyethersulfone, or polyamide.

4. The composite filter element structure according to claim 1 wherein the support and drainage medium includes a woven material.

5. A method of forming a composite filter element structure comprising:

positioning a porous filter medium to be in communication with a first surface of a support and drainage medium;

positioning a second surface of said support and drainage medium to be in communication with a surface of a substrate having at least one fluid pathway to form a component assembly;

introducing a bonding composition to said component assembly, said bonding composition at least slightly dissolving a portion of the substrate surface without significantly dissolving the porous filter medium or the support and drainage medium;

contacting the support and drainage medium and the porous filter medium with the dissolved portion of the substrate; and removing the bonding composition and resolidifying, a portion of the substrate within the support and drainage medium and the porous filter medium to form an adhesive-free bond between the porous filter medium, the support and drainage medium, and the substrate without unduly blinding the porous filter medium.

6. The method of claim 5 further comprising applying pressure to compress the porous filter medium, the support and drainage medium, and the substrate.

7. The method of claim 5 wherein positioning the support and drainage medium to be in communication with the substrate surface comprises positioning the support and drainage medium to support the porous filter medium over the fluid pathway of the substrate.

8. The method of claim 5 wherein positioning the porous filter medium to be in communication with the first surface of the support and drainage medium comprises contacting the porous filter medium with the first surface of the support and drainage medium.

9. The method of claim 5 wherein positioning the second surface of the support and drainage medium to be in communication with the surface of the substrate comprises contacting the second surface of the support and drainage medium with the substrate.

10. The method of claim 5 wherein introducing the bonding composition comprises introducing a bonding composition which includes a first chemical species comprising a solvent for the substrate and a second chemical species comprising a non-solvent for the substrate.

11. The method of claim 5 wherein introducing the bonding composition comprises introducing the bonding composition to the porous filter medium before the support and drainage medium.

12. The method of claim 5 wherein introducing the bonding composition comprises introducing the bonding composition to the substrate before the support and drainage medium.

13. The method of claim 12 wherein introducing the bonding composition to the substrate before the support and drainage medium comprises introducing the bonding composition into a permeate outlet port of the substrate.

14. The method of claim 12 wherein introducing the bonding composition to the substrate before the support and drainage medium comprises introducing the bonding composition along one or more grooves in the substrate surface.

15. The method of claim 5 wherein the porous filter medium and the support and drainage medium are slightly soluble in the bonding composition.

16. The method of claim 5 wherein contacting the support and drainage medium and the porous filter medium with the dissolved portion of the substrate comprises contacting the dissolved portion of the substrate with a non-woven fibrous support and drainage medium and the porous filter medium.

17. The method of claim 5 wherein contacting the support and drainage medium and the porous filter medium with the dissolved portion of the substrate comprises contacting the support and drainage medium and the porous filter medium with the dissolved portion of the substrate while the component assembly is enclosed within a sealed chamber.

18. The method of claim 5 wherein removing the bonding composition comprises applying a vacuum.

19. The method of claim 5 wherein removing the bonding composition comprises removing the bonding composition in the direction of the porous filter medium.

20. The method of claim 19 wherein removing the bonding composition in the direction of the porous filter medium comprises applying a vacuum in the direction of the porous filter medium.

21. The method of claim 5 wherein removing the bonding composition comprises removing the bonding composition in the direction of the substrate.

22. The method of claim 21 wherein removing the bonding composition in the direction of the substrate comprises removing the bonding composition through a permeate outlet port of the substrate.

23. The method of claim 22 wherein removing the bonding composition through the permeate outlet port of the substrate comprises directing the bonding composition though one or more grooves in communication with the permeate outlet port.

24. The method of claim 23 wherein directing the bonding composition though one or more grooves in communication with the permeate outlet port comprises applying a vacuum to the permeate outlet port.

25. The method of claim 8 wherein positioning the second surface of the support and drainage medium to be in communication with the surface of the substrate comprises contacting the second surface of the support and drainage medium with the substrate.

26. The method of claim 25 further comprising applying pressure to compress the porous filter medium, the support and drainage medium, and the substrate.

27. The method of claim 26 wherein removing the bonding composition comprises applying a vacuum.

28. The method of claim 27 wherein contacting the support and drainage medium and the porous filter medium with the dissolved portion of the substrate comprises contacting the dissolved portion of the substrate with a non-woven fibrous support and drainage medium and the porous filter medium.

29. The method of claim 28 wherein introducing the bonding composition comprises introducing a bonding composition which includes a first chemical species comprising a solvent for the substrate and a second chemical species comprising a non-solvent for the substrate.

30. The method of claim 27 wherein contacting the support and drainage medium and the porous filter medium with the dissolved portion of the substrate comprises contacting the support and drainage medium and the porous filter medium with the dissolved portion of the substrate while the component assembly is enclosed within a sealed chamber.

31. The method of claim 30 wherein introducing the bonding composition comprises introducing a bonding composition which includes a first chemical species comprising a solvent for the substrate and a second chemical species comprising a non-solvent for the substrate.

32. The composite filter element structure of claim 1 wherein the drainage pathway of the substrate has a plurality of grooves, and the support and drainage medium is bonded to the portion of the substrate between adjacent grooves.

33. The composite filter element structure of claim 1 wherein the porous filter medium comprises two or more layers.

34. The composite filter element structure of claim 1, wherein the substrate is formed as a sheet or plate having opposing surfaces and each surface is bonded free of any adhesive to a support and drainage medium and a porous filter medium.

35. A composite filter element structure for providing a filtrate of permeate, the composite filter element structure comprising:
    a porous filter medium through which filtrate/permeate passes;
    a porous support medium supporting the porous filter medium and allowing filtrate/permeate to pass between the porous filter medium and the substrate; and
    a substrate including a drainage mechanism for passage of the filtrate/permeate;
    wherein the porous filter medium and the porous support medium communicate with the drainage mechanism of the substrate and wherein the porous filter medium and the porous support medium are bonded to the substrate free of any adhesive, wherein portions of the substrate are resolidified within the porous support medium and the porous filter medium without unduly blinding the porous filter medium.

36. The composite filter element structure of claim 35 wherein the porous filter medium includes a microporous filter medium.

37. The composite filter element structure of claim 35 wherein the porous filter medium includes a polymeric material.

38. The composite filter element structure of claim 37 wherein the porous filter medium includes a polyamide, fluoropolymer, or polyethersulfone.

39. The composite filter element structure of claim 35 wherein the porous filter medium comprises two or more layers.

40. The composite filter element structure of claim 35 wherein the substrate comprises a polymeric material.

41. The composite filter element structure of claim 40 wherein the substrate comprises polyethersulfone, polysulfone, or polyamide.

42. The composite filter element structure of claim 35 wherein the drainage mechanism of the substrate has a plurality of grooves, and the porous support medium is bonded to the portion of the substrate between adjacent grooves.

43. The composite filter element structure of claim 42 wherein the porous support medium bridges the adjacent grooves of the substrate.

44. The composite filter element structure of claim 35 wherein the porous filter medium and the porous support medium are bonded to the substrate by solidified substrate contained within the porous support medium and the porous filter medium.

45. The composite filter element structure of claim 35, wherein the substrate is formed as a sheet or plate having opposing planar surfaces and each planar surface is bonded free of any adhesive to a porous support medium and a porous filter medium.

46. The composite filter element structure of claim 35 wherein the substrate is rigid.

47. The composite filter element structure of claim 35 wherein the porous support medium includes a polymeric material.

48. The composite filter element structure of claim 47 wherein the porous support medium includes a non-woven fibrous material.

49. The composite filter element structure of claim 48 wherein the porous support medium has a thickness of less than 20 mils.

50. The composite filter element structure of claim 49 wherein the porous support medium has low edgewise flow resistance.

51. The composite filter element structure of claim 35 wherein the porous support medium includes a non-woven fibrous material.

52. The composite filter element structure of claim 35 wherein the porous support medium has a thickness of less than 20 mils.

53. The composite filter element structure of claim 35 wherein the porous support medium has low edgewise flow resistance.

* * * * *

UNITED STATES PATENT AND TRADEMARK OFFICE
CERTIFICATE OF CORRECTION

PATENT NO. : 5,804,280
DATED : September 8, 1998
INVENTOR(S) : Pall et al.

It is certified that error appears in the above-identified patent and that said Letters Patent is hereby corrected as shown below:

Column 16, Line 48, (after "resolidifying") delete ",";

Column 17, Line 60, change "though" to --through--;

Line 63, change "though" to --through--;

Signed and Sealed this

Sixteenth Day of February, 1999

Attest:

Attesting Officer

Acting Commissioner of Patents and Trademarks